Aug. 4, 1970                K. N. K. WILLMOTT                3,522,552
                         SEMICONDUCTOR LASER UNIT
                           Filed March 26, 1968
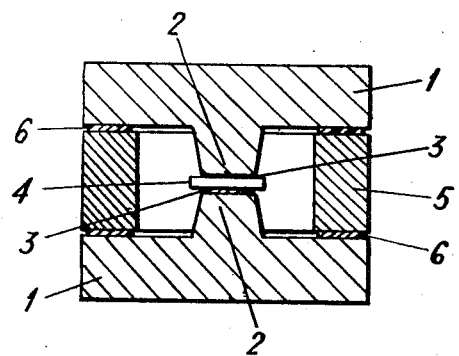
Inventor
KENNETH N. K. WILLMOTT
By Philip M. Bolton
Attorney 3,522,552
SEMICONDUCTOR LASER UNIT
Kenneth Nash Knight Willmott, Waltham Cross, England, assignor to International Standard Electric Corporation, New York, N.Y., a corporation of Delaware
Filed Mar. 26, 1968, Ser. No. 716,195
Claims priority, application Great Britain, Apr. 18, 1967, 17,767/67
Int. Cl. H01s 3/04
U.S. Cl. 331—94.5
6 Claims

ABSTRACT OF THE DISCLOSURE

A laser unit including a semiconductor die and a mount, suitable for use where resistance to thermal shock is required, utilizing two circular copper contact members, each having a central projection extending therefrom towards the other projection. The end face of each projection is coated with indium, and a gallium arsenide laser die is secured between the end faces. A transparent glass tube, coaxial with the projections, is mounted between the contact members and encloses the die and projections, and is separated from the contact members by coaxial indium washers. The contact members, the indium washers and the glass tube are each pressure welded to each other to thereby enclose the laser die in a sealed chamber.

BACKGROUND OF THE INVENTION

The invention relates to a laser unit and to a method of fabricating same.

Semiconductor lasers, for example gallium arsenide lasers, require good uniform contacts which must provide thermal and electrical contact to the operating system which may be a simple heat dissipating arrangement suitable for room temperature lasers or a more complex cryostat arrangement suitable for operation at a temperature of the order of 77° K. Present day methods of mounting semiconductor laser dies, so that adequate thermal and electrical contacts are obtained tend to be very complicated.

It is an object of the present invention to provide a comparatively compact and robust laser assembly which has a good resistance to thermal shock and which has a laser mounting arrangement which is easy to assemble and comprises easily manufactured component parts.

SUMMARY OF THE INVENTION

In accordance with the invention I have provided laser unit including two contact members which each have a projection extending from one major surface thereof, the end face of each of the said projections having a layer of indium thereon, a semiconductor laser die which is located and secured between the end faces of the said projections by means of said layers of indium, a transparent tubular member which encloses said semiconductor laser die and said projections, and two indium washers, each one of which is located and secured between said one major surface of one of said contact members and one end of said transparent tubular member thereby enclosing said semiconductor laser die in a sealed chamber to provide a laser unit which is resistant to thermal shock.

BRIEF DESCRIPTION OF THE DRAWING

The foregoing and other features according to the invention will be understood from the following description with reference to the single figure of the accompanying drawing which diagrammatically illustrates a sectional side elevation of a laser unit according to the invention.

DESCRIPTION OF THE PREFERRED EMBODIMENT

Referring to the single figure of the accompanying drawing, the laser unit diagrammatically illustrated therein comprises two contact members 1 which are made from a material having the necessary thermal and electrical conduction properties, for example copper and which are each provided with an integral raised section 2, the end faces of which are coated by appropriate means with a layer of indium 3, a semiconductor laser die 4, for example of gallium arsenide which is located and held between the raised sections 2, a transparent tubular member 5, for example of glass which completely surrounds the semiconductor laser die 4 and which together with two indium washers 6, located one at each end of the transparent tubular member 5, forms a seal with the contact members 1 and encloses the semiconductor laser die 4 within a sealed chamber thereby giving rise to the laser die mounting which is capable of withstanding large thermal shocks.

The contact members 1 which in practice connect the semiconductor laser die 4 to the operating system are normally cylindrical in cross-section although this need not be the case, the contact members 1 may be of any desired cross-section, for example square or rectangular, which is selected to suit particular requirements. Similarly, whilst the transparent tubular member 5 and indium washers 6 are normally cylindrical they may also be of any desired cross-section, for example square or rectangular, which is again selected to suit particular requirements.

The compact and robust laser unit illustrated in the single figure of the accompanying drawing which may be mounted into closely packed arrays lends itself to mass production techniques since the component parts may be easily manufactured using conventional machine tools et cetera and the assembly of the laser unit is capable of being performed automatically.

In the assembly of the laser unit according to the invention one of the contact members 1 is placed on a flat surface such that the section 2 having the layer of indium 3 on the end face thereof is uppermost, an indium washer 6 is then placed in contact with the upper surface of the contact member 2 such that the section 2 is substantially coaxial with the indium washer 6, the transparent tubular member 5 is then placed on top of the indium washer 6 such that it is substantially coaxial therewith, another indium washer 6 is then placed on top of the transparent tubular member 5 such that it is substantially coaxial therewith, the semiconductor laser die 4 is then placed on top of the section 2, then the other contact member 1 is placed in co-axial relationship with the other components such that the layer of indium 3 on the end face of the section 2 is in contact with the semiconductor laser die 4 and the surface of the other contact member 1 from which the section 2 projects is in contact with the indium washer 6 and finally the complete assembly is pressed together by suitable means, for example a hand operated or power operated press, ensuring that the end faces of the sections 2 provided by way of the layers of indium 3, which are pressure welded to the semiconductor laser die 4, a uniform contact with the semiconductor laser die 4. The indium washers 6 during the application of pressure are also pressure welded to the contact members 1 and to the transparent tubular member 5 thereby forming the sealed chamber mentioned in a preceding paragraph.

It is to be understood that the foregoing description of specific examples of this invention is made by way of example only and is not to be considered as a limitation on its scope.

I claim:
1. A semiconductor laser unit comprising:
two contact members having a projection extending from a major surface thereof towards the other member,
a layer of indium on each of the end faces of each projection,
a semiconductor laser die mounted between the aforesaid layers of indium,
a transparent tubular member enclosing the aforesaid laser die and projections, and
two indium washers, each mounted between a different one of said major surfaces and the transparent tubular member,
the contact members, washers, and transparent member being in sealed relationship to one another to thereby enclose the aforesaid semiconductor laser die in a sealed chamber.

2. A semiconductor laser unit according to claim 1, wherein the two contact members are cylindrical and the projections extend centrally therefrom.

3. A semiconductor laser unit according to claim 2, wherein the projections, the tubular member and the indium washers are in coaxial relation one to the other.

4. A semiconductor laser unit according to claim 1, wherein the projections are an integral part of said contact members.

5. A semiconductor laser unit according to claim 1, wherein the transparent tubular member is of glass and the contact members are of copper.

6. A semiconductor laser unit according to claim 1, wherein said contact members, indium washers and tubular members are sealed to each other by a pressure weld.

References Cited
UNITED STATES PATENTS 3,303,432  2/1967  Garfinkel et al.
3,316,464  4/1967  Hilsum.
3,351,698  11/1967  Marinace.

RONALD L. WIBERT, Primary Examiner

E. BAUER, Assistant Examiner

U.S. Cl. X.R.

317—234